United States Patent
Mercier

(10) Patent No.: US 7,072,159 B2
(45) Date of Patent: *Jul. 4, 2006

(54) CURRENT LIMITER WITH LOW DROP VOLTAGE FOR SURGE PROTECTION AND FUSE PROTECTION

(75) Inventor: Claude Mercier, Peterborough (CA)

(73) Assignee: Siemens Milltronics Process Instruments Inc., Ontario (CA)

( * ) Notice: Subject to any disclaimer, the term of this patent is extended or adjusted under 35 U.S.C. 154(b) by 285 days.

This patent is subject to a terminal disclaimer.

(21) Appl. No.: 10/378,883

(22) Filed: Mar. 5, 2003

(65) Prior Publication Data

US 2003/0171009 A1    Sep. 11, 2003

(30) Foreign Application Priority Data

Mar. 5, 2002    (CA) ................................ 2374795

(51) Int. Cl.
    *H02H 7/00*    (2006.01)
(52) U.S. Cl. ............................................. 361/58
(58) Field of Classification Search ................ 361/18, 361/58, 93.1, 100, 103
    See application file for complete search history.

(56) References Cited

U.S. PATENT DOCUMENTS 5,416,723 A * 5/1995 Zyl ........................... 713/300
6,140,940 A * 10/2000 Klofer et al. .......... 340/870.39

* cited by examiner

*Primary Examiner*—Stephen W. Jackson
(74) *Attorney, Agent, or Firm*—Harness, Dickey & Pierce, P.L.C.

(57) ABSTRACT

A current limiter circuit which exhibits a low dropout voltage. The current limiter circuit is suitable for protecting process control equipment operating on a current loop. The current limiter circuit includes an interface for coupling to the current loop, and a current source element coupled to the process control equipment. The current source element comprises a current limiter circuit to limit the current flowing to the process control equipment, and a voltage reference circuit coupled to the current limiter circuit provides a predetermined voltage reference during operation of the current source element.

11 Claims, 4 Drawing Sheets

CURRENT LIMITER WITH LOW DROP VOLTAGE FOR SURGE PROTECTION AND FUSE PROTECTION

FIELD OF THE INVENTION

The present invention relates to process control equipment, and more particularly to a current limiter for providing surge protection and fuse protection suitable for loop-powered process control instruments.

BACKGROUND OF THE INVENTION

Time of flight ranging systems, are commonly used in level measurement applications, and referred to as level measurement systems. Level measurement systems determine the distance to a reflector (i.e. reflective surface) by measuring how long after transmission of a burst of energy pulses, an echo is received. Such systems typically utilize ultrasonic pulses, pulse radar signals, or microwave energy signals.

Time of flight ranging systems are commonly utilized in remote locations where process variable data is transmitted to a central location for further processing or collection, for example storage tanks and vessels in a petro-chemical plant. A common means for transmitting such data is by a current loop. The value of the process variable is represented by the magnitude of a current passing through the loop, with the magnitude lying between predetermined minimum and maximum values, typically 4 mA and 20 mA, for a 20 mA loop. Such a current loop has a high degree of noise immunity and has gained widespread industrial acceptance.

In time of flight systems, the transmitter usually has electrical power requirements of its own, and it is often convenient to meet these power requirements from the current passing in the loop. A limitation of such loop-powered transmitters has been that they must be able to operate at the minimum level of loop current, typically 4 mA. In recent years, a number of "smart" or "intelligent" transmitters have been developed, which utilize microprocessors or microcontrollers to control sensing or measurement of the process variable, and conversions of the data generated into an appropriate current level in the loop.

When the instrument is first turned on, i.e. powered up, there is an inrush of current into the level measurement instrument. In addition to inrush conditions, the circuitry may also be subjected to surges comprising a fast transient voltage impulse or transients. To protect the circuitry in the instrument, for example in an intrinsically safe application or an explosion-proof application, a 50 mA fuse is commonly provided on input port which is coupled to the 20 mA loop. Advantageously, the fuse exhibits a very low dropout voltage, if the fuse is operated in protection mode, and the inrush current exceeds the fuse rating, then the fuse will blow effectively limiting the current and requiring replacement of the fuse. It will be appreciated that for certain remote situated level measurement installations this is not practical. Moreover, in explosive environments, the circuitry is usually potted, e.g. encased in epoxy, thereby making it next to impossible to replace a blown fuse without replacing the entire instrument. It is also possible to use a resistor to limit the inrush or surge current. Advantageously, a properly rated resistor can limit the current without the need for replacement like a fuse, however, the resistor limiter can result in an appreciable voltage drop, which is undesirable, especially, in a loop-powered implementation.

In other applications, such as switching power supplies, it is also advantageous to limit the inrush current while also minimizing the voltage drop across the limiter to save power.

The inrush current is specified for various applications according to standards organizations. For example in Germany, under the NAMUR standard, the inrush current must be less than 15 times the normal peak current in steady state for level measurement instruments used in petro-chemical applications.

One known approach is to configure an operational amplifier, i.e op-amp, to function as a current source and thereby limit the inrush current. Advantageously, an op-amp circuit can be configured to be stable over temperature. Unfortunately, standard op-amp circuits are not suitable for loop-powered applications because of the voltage reference level, typically 1.25V and greater, and the high power consumption requirements.

Accordingly, there remains a need for a current limiter which provides a low dropout voltage like a fuse, but does need to be replaced if the inrush current temporarily exceeds the rated value, like a resistor, and suitable for use in a current loop application.

BRIEF SUMMARY OF THE INVENTION

The present invention provides current limiter circuitry for inrush and surge protection which exhibits a low dropout voltage.

In a first aspect, the present invention provides a protection device for process control equipment operating on a current loop, said process control equipment having an interface for coupling to the current loop, said protection device comprising: a current source element, said current source element being coupled to the interface of the process control equipment, and said current source element including a current limiter circuit to limit the current flowing in the interface; a voltage reference circuit, said voltage reference circuit being coupled to said current source element, and providing a predetermined voltage reference during operation of said current source element.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference will now be made, by way of example, to the accompanying drawings which show, by way of example, preferred embodiments of the present invention, and in which.

DETAILED DESCRIPTION OF THE PREFERRED EMBODIMENTS

Figure 1:
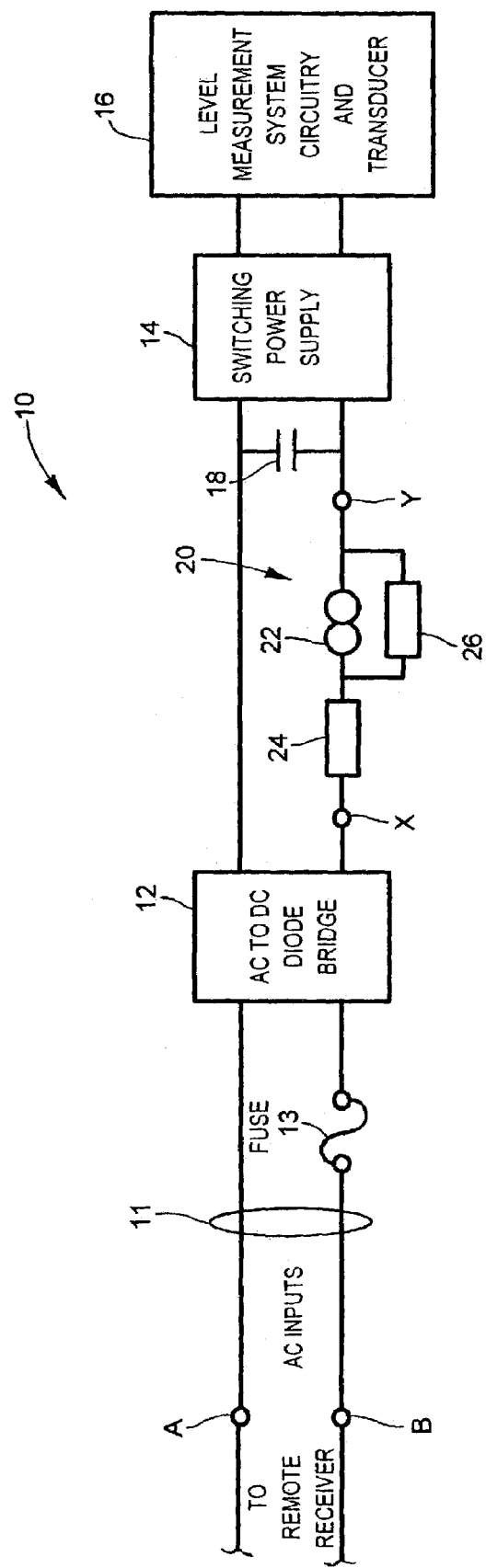
FIG. 1 is a schematic diagram of current limiter circuit in a level measurement instrument according to the present invention.

Reference is first made to FIG. 1, which shows a level measurement instrument (i.e. time of flight ranging system) 10 incorporating a current limiter circuit 20 according to the present invention. While the current limiter according to the invention is described in detail below in the context of a level measurement system, it is to be appreciated that the current limiter has wider applicability in devices such as switching power supplies and other electronic/electrical circuitry.

As shown in FIG. 1, the level measurement instrument 10 comprises an AC-to-DC diode bridge 12, a switching power supply 14, and circuitry 16 for performing the level measurement. The level measurement instrument 10 also preferably includes a capacitor 18 which provides an energy reservoir as described in U.S. Pat. No. 5,416,723 which is issued on May 16, 1995 to the common assignee of the subject application, and is herein incorporated by reference.

The AC-to-DC diode bridge 12 provides the interface to a current loop indicated generally by reference 11. The current loop 11 couples the level measurement device 10 to a remote receiver (not shown). The AC input from the current loop 11 is converted into a DC voltage which is applied to the switching power supply 14. The switching power supply 14 generates the voltages required for operating the level measurement circuitry 16. As shown in FIG. 1, the capacitor 18 is coupled across the input port to the switching power supply 14 and acts as an energy reservoir.

In known manner, the level measurement circuitry 16 determines the measured range of the target surface and converts the measurement into digital data representing a desired loop current. The digital data is translated into analog form and the current flowing in the current loop 11 is regulated by the AC-to-DC bridge 12 to transmit the information to the remote receiver (not shown) which typically comprises a remote receiver current sensor (not shown) in series with a voltage power supply (not shown). For example, if the digital signal has a high value, then a high level current signal is generated for the current loop 11; conversely, if the digital signal is a low value, a low level current signal is generated for the current loop 11.

Referring to FIG. 1, the current limiter circuit 20 comprises a current source 22, a sensing resistor 24, and a power resistor 24. According to this aspect of the invention, the current limiter circuit 20 functions as an inrush current suppressor. The current source 22 in the circuit 20 limits or controls the inrush current allowed to flow in the circuit thereby protecting the circuitry. The current limiter circuit 20 is described in more detail below with reference to FIGS. 2, 3, and 4 according to preferred embodiments of the invention. As also shown in FIG. 1, a fuse 13 is provided for additional inrush current protection, i.e. when the when the level measurement instrument 10 is turned on.

Figure 2:
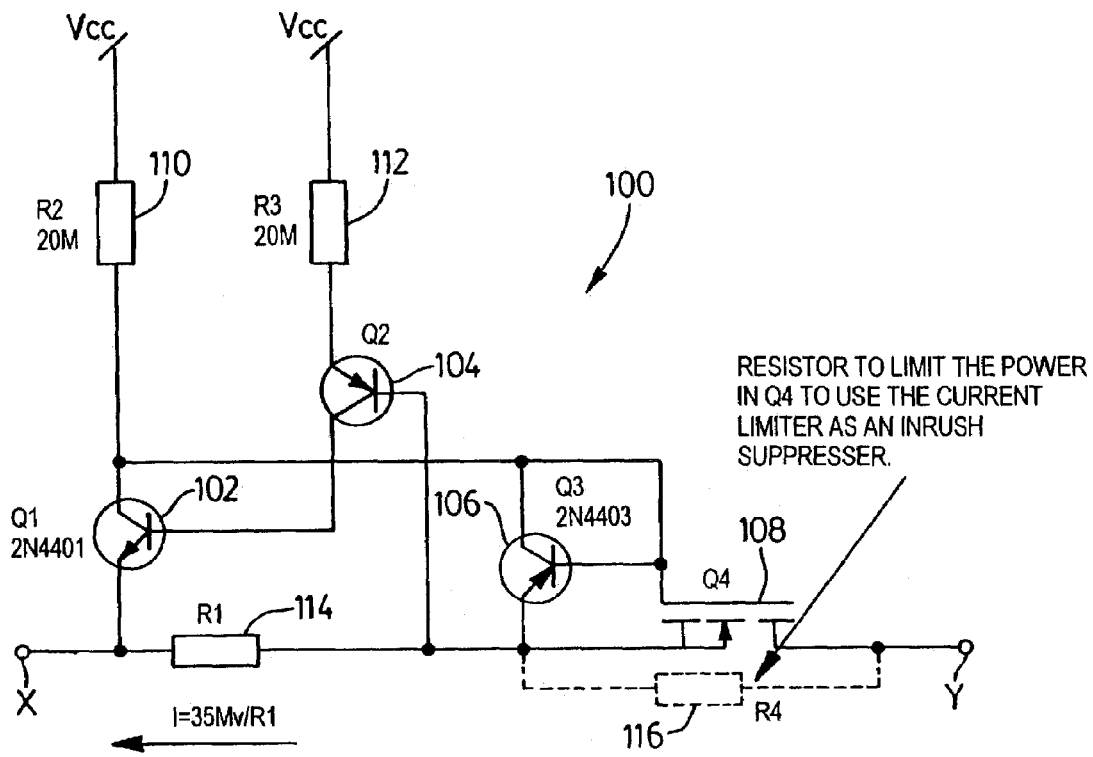
FIG. 2 is a schematic diagram of a current limiter circuit according to a first embodiment of the present invention.

Reference is made to FIG. 2, which shows the current limiter circuit according to a first embodiment of the present invention and indicated generally by reference 100. The current limiter circuit 100 comprises first 102, second 104, and third 106 Bipolar Junction Transistors or BJT's, and a MOSFET transistor 108. As shown in FIG. 2, the collector of the first BJT 102 is coupled to a positive voltage rail $V_{CC}$ through a resistor 110. The emitter of the second BJT 104 is also coupled to the positive voltage rail $V_{CC}$ through another resistor 112. The base of the first BJT 102 is coupled to the collector of the second BJT 104, and the emitter of the first BJT 102 is connected to one terminal of the sensing resistor 24 (FIG. 1) represented by reference 114 in FIG. 2. The other terminal of the sensing resistor 114 is coupled to the base of the second BJT 104 and the emitter of the third BJT 106 and the gate of the MOSFET 108. As shown, the collector and the base of the third BJT 106 are tied together to form a diode-connected transistor. The diode-connected BJT 106 functions as a Zener diode to limit the voltage in the circuit 100 approximately in the range 9–10 Volts. When compared to a conventional Zener diode, the diode-connected BJT 106 has a smaller knee current and is therefore preferable for the circuit 20. The base of the third BJT 106 is also connected to the drain of the MOSFET 108. The power resistor 26 (FIG. 1) is represented by reference 116 in FIG. 2. The power resistor 26 is coupled across the gate and source terminals of the MOSFET 108 as shown. The purpose of the power resistor 116 is to limit the current flowing through the MOSFET 108.

The emitter of the first BJT 102 forms the output terminal Y (FIG. 1) for the current limiter circuit 100 and the source of the MOSFET 108 forms the input terminal X (FIG. 1) for the current limiter circuit 100.

When the circuit 100 is utilized as an inrush current suppressor, the inrush current will flow through the MOSFET 108, and the power resistor 116 is provided to prevent damage to the MOSFET 108 in the event the inrush current exceeds the rating of the MOSFET 108. For example during start-up, the capacitor 18 (FIG. 1) is not charged and acts as a short circuit resulting in a high voltage appearing across the MOSFET 108, and the power resistor 116 protects the MOSFET 108 by limiting the current.

The circuitry in the current limiter circuit 100 also provides a low dropout voltage, and as will be described in more detail the circuitry is designed to generate a small voltage drop across the sensing resistor 114 and an essentially negligible voltage drop across the current source.

Referring to FIG. 2, the second BJT 104 is configured to provide a voltage reference. The second BJT 104 is operated in saturation, i.e. the collector-base junction and the emitter-base junction are both forward biased. In saturation, the resultant voltage drop across the collector-emitter of the BJT 104 is 35 mV for a 2N4403 model type transistor. The 35 mV is the difference between the voltage drop across the collector-base junction and the voltage drop across the emitter-base junction. Applying Kirchoff's Voltage Law or KVL the 35 mV drop appears across the sensing resistor 114. The current flowing in the sensing resistor 114 is determined as I=35 mV/R1, where R1 is the resistance value for the resistor 114. It has been found that 35 mV provides a suitable voltage reference level for loop-powered applications.

It will be appreciated that some transistors will have different saturation voltages than the 2N4403 type devices. Since any temperature variation across the collector and emitter junctions of the BJT 104 will be the same, the voltage drop, i.e. 35 mV, across the collector-emitter will remain constant thereby providing a stable voltage reference for the current limiter circuit 100. By providing a stable voltage drop, the output from the current source, i.e. the MOSFET 108, will not be subject to wide variations.

As shown in FIG. 1, the first 102 BJT is configured to bias the current source, i.e. the MOSFET 108. The diode-connected BJT 106 is forward biased and provides a bias voltage at the collector of the first BJT 102. The two resistors 110, 112 are selected with a high resistance, e.g. 20 MOhms, so as not to draw a large current which would result largely in power dissipation through heating. However, this means that a lower current is available to feed the current source, i.e. the MOSFET 108. Accordingly, the first BJT 102 is configured to operate in the active region. Advantageously, this provides a fast response which allows the circuitry to respond to voltage transients. The first BJT 102 together with the sensing resistor 114 also provides a load for the second BJT 104. The resistors 110, 112 preferably have the same value so that the current flowing through the respective emitter of the first BJT 102 and the second BJT 104 is the same.

Since both p-n junctions of the BJT 104 will have the same temperature coefficient, the voltage drop across the emitter and the collector of the BJT 104 is a constant 35 mV drop which is used as the voltage reference.

In order maintain consistent temperature coefficients between the BJT's 102, 104, 106, the first embodiment of the current limiter circuit 100 as shown in FIG. 2 is preferably implemented in single silicon, for example, in an ASIC device. However, discrete transistor devices from the same manufacturing batch will typically be within +/−10%, and as such be within a reasonable range for implementing the circuit.

Figure 3:
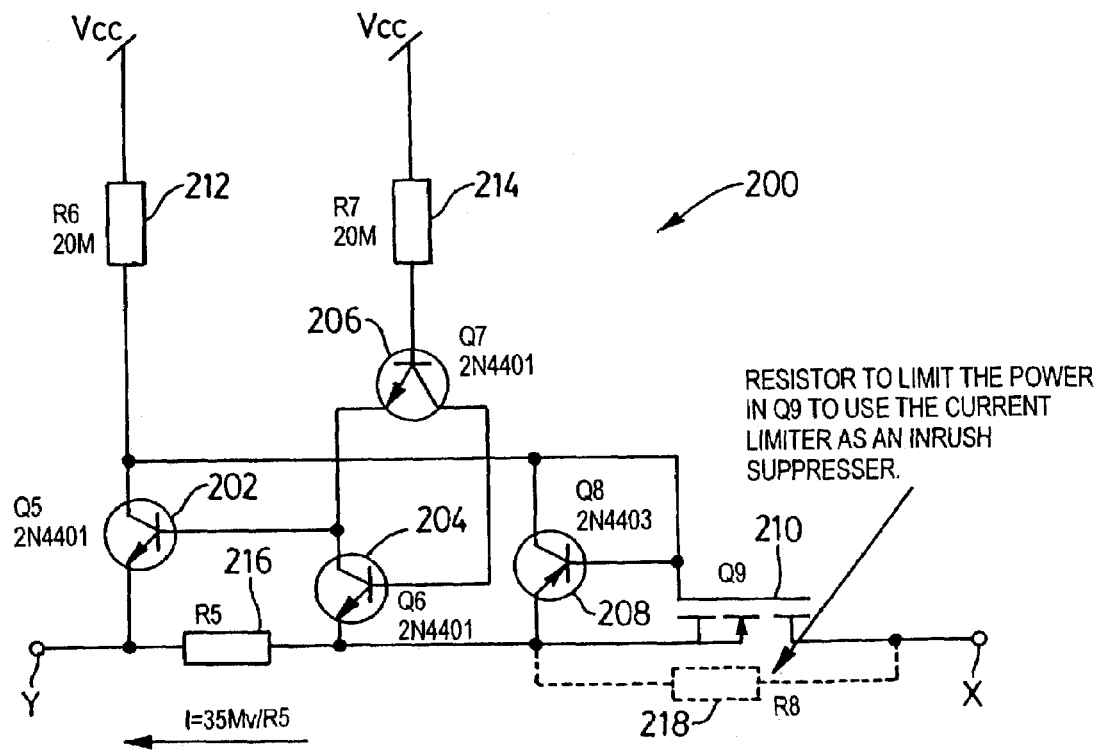
FIG. 3 is a schematic diagram of a current limiter circuit according to a second embodiment of the present invention.

Reference is next made to FIG. 3, which shows a second embodiment of the current limiter circuit indicated by reference 200. The current limiter circuit 200 comprises first 202, second 204, third 206, and fourth 208 BJT's, and a MOSFET transistor 210. For the current limiter circuit 200, the MOSFET 210 comprises the current source element 22 (FIG. 1) and the third BJT 206 serves as the voltage reference as will be described in more detail below.

As shown in FIG. 3, the collector of the first BJT 202 is coupled to a positive voltage rail $V_{CC}$ through a first resistor 212. The base of the third BJT 206 is also coupled to the positive voltage rail $V_{CC}$ through a second resistor 214. The emitter of the third BJT 206 is connected to the base of the first BJT 202 and the collector of the second BJT 204. The collector of the third BJT 206 is connected to the base of the second BJT 204. The collector of the first BJT 202 is connected to collector of the fourth BJT 208. The collector and base of the BJT 208 are tied together to form a diode-connected transistor. The diode-connected BJT 208 functions as a Zener diode to limit the voltage in the circuit 200 approximately in the range 9–10 Volts. When compared to a conventional Zener diode, the diode-connected BJT 106 has a leakage current which is smaller than the "knee" or reverse current for a Zener diode which is typically in the milli-Ampere range. The base of the fourth BJT 208 is also coupled to the drain of the MOSFET 210, and the emitter of the BJT 208 is connected to the gate of the MOSFET 210. The sensing resistor 24 (FIG. 1) is represented by a resistor 216 in FIG. 3. One terminal of the resistor 216 is connected to the emitter of the first BJT 202 and forms the output terminal Y for the current limiter circuit 200. The other terminal of the resistor 216 is connected to the emitter of the second BJT 204 which is also connected to the collector of the fourth BJT 208 and the gate of the MOSFET 210. The source of the MOSFET 210 forms the input terminal X for the current limiter circuit 200. The power resistor 26 (FIG. 1) is represented by a resistor 218 in FIG. 3. The resistor 218 is connected across the source and gate of the MOSFET 210 and serves to limit the current through the MOSFET 210, particularly when the current limiter circuit 200 is used for suppressing inrush current.

As depicted in FIG. 3, the third BJT 206 comprises a 2N4401 type transistor, as do the first 202 and the second 204 BJT's. The fourth BJT 208 comprises a 2N4403 type transistor.

In accordance with the second embodiment for the current limiter circuit 200, the voltage reference is provided by the third BJT 206. The third BJT 206 is configured to operate in saturation. In saturation the voltage across the collector-emitter of the third BJT 206 is 35 mV for a 2N4401 type transistor. As discussed above, the collector-emitter saturation voltage may vary for other types of transistors. The second BJT 204 is operated in the active region to provide a fast response. The second BJT 204 also serves to lower the impedance at the output terminal Y for the current limiter circuit 200. The diode-connected BJT 208 is connected to the collector of the first BJT and provides a bias voltage for the first BJT 202. The first BJT 202 and the sensing resistor 216 provide a load for the third BJT 206. The emitter follower configuration of the first BJT 102 advantageously lowers the output impedance of the circuit 100, i.e. at the output terminal Y. Since the base voltage for the BJT 204 varies over temperature, the first BJT 202 provides compensation with the base connected to the collector of the BJT 204. If the first BJT 202 and the second BJT 204 are both the same device, e.g. 2N4401, the temperature variance should be approximately the same and as a result the voltage difference between the emitter of first BJT 202 and the emitter of the second BJT 204 will remain at 35 mV.

Like the current limiter circuit 100 described above, the second embodiment for the current limiter circuit 200 is preferably implemented in a single silicon die, for example, in an ASIC device, to maintain consistent temperature coefficients between the BJT devices 202, 204, 206 and 208.

Figure 4:
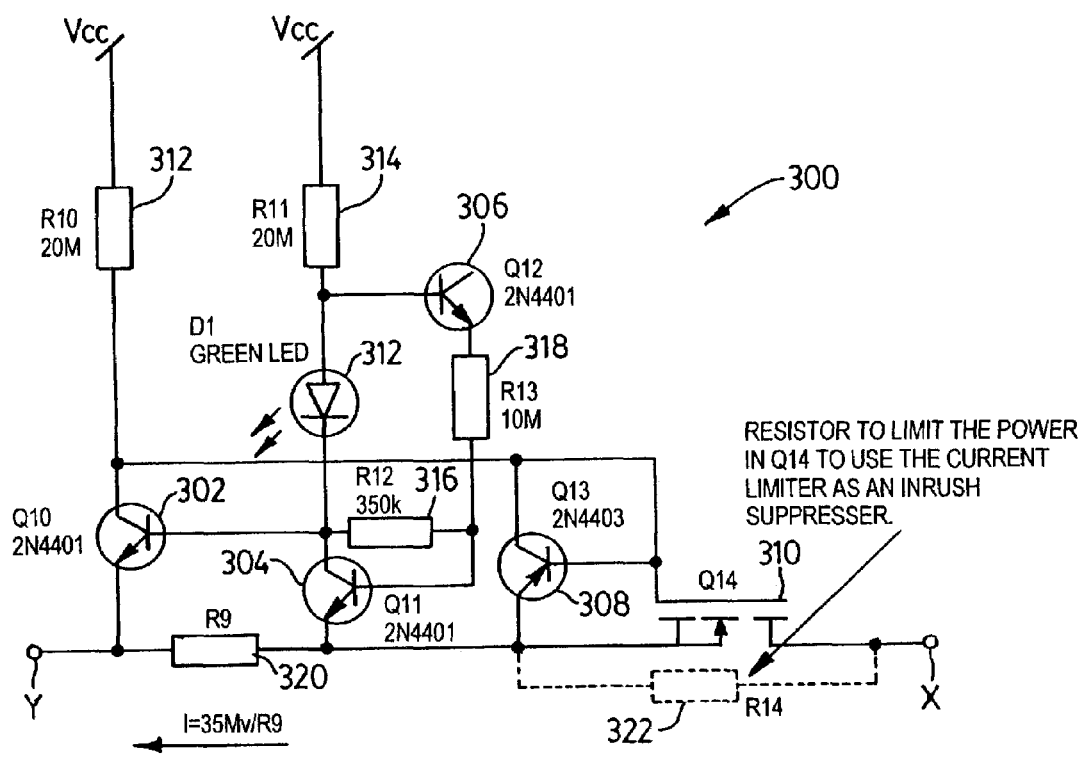
FIG. 4 is a schematic diagram of a current limiter circuit according to a third embodiment of the present invention.

Reference is next made to FIG. 4, which shows a third embodiment of the current limiter circuit indicated by reference 300. The current limiter circuit 300 comprises first 302, second 304, third 306, and fourth 308 BJT's, and a MOSFET transistor 310. The current limiter circuit 300 also includes a Light Emitting Diode or LED 312. The LED 312 together with the third BJT 306 provide a stable voltage reference. As will be described in more detail below, the arrangement for voltage reference allows the magnitude of the reference voltage to be varied and thereby the voltage drop across the sensing resistor 24 (FIG. 1) represented by resistor 320 in FIG. 4. The MOSFET 310 comprises the current source 22 (FIG. 1) for the current limiter circuit 300.

As shown in FIG. 4, the collector of the first BJT 302 is coupled to a positive voltage rail $V_{CC}$ through a first resistor 312. The emitter of the first BJT 302 is connected to one terminal of the sensing resistor 320. The second terminal of the sensing resistor 320 is connected to the emitter of the second BJT 304. The collector of the second BJT 304 is connected to the base of the first BJT 302. The base of the first BJT 302 is also connected to the cathode of the LED 312, and the anode of the LED 312 is coupled to the positive voltage rail $V_{CC}$ through a resistor 314. A resistor 316 is connected across the collector and the base of the second BJT 304. The base of the second BJT 304 is coupled to the emitter of the third BJT 306 through a resistor 318. The base of the third BJT 306 is connected to the anode of the LED 312. The fourth BJT 308 is diode-connected with the collector and base tied together. The diode-connected BJT 308 functions as a Zener diode to limit the voltage in the circuit 300 approximately in the range 9–10 Volts. When compared to a conventional Zener diode, the diode-connected BJT 308 has a leakage current which is smaller than the "knee" or reverse current for a Zener diode which is typically in the milli-Ampere range. The base of the fourth BJT 308 is also connected to the drain of the MOSFET 310. The source of the MOSFET 310 forms the input terminal X for the current limiter circuit 300. The gate of the MOSFET 310 is tied to the emitter of the second BJT 304 and the emitter of the fourth BJT 308. The gate of the MOSFET 310 is also connected to the sensing resistor 320. The power resistor 26 (FIG. 1) is represented by a resistor 322 in FIG. 4. The resistor 322 is connected across the source and gate of the MOSFET 310 and serves to limit the current through the MOSFET 210.

The LED 312 is implemented using a green LED which provides a forward bias voltage of 1.5V. The third BJT 306 is forward biased and the voltage drop across the base-emitter junction is 0.5V. Taking the difference between the voltage drop across the LED 312 and the BJT 306 gives 1.0 Volts. Since the green LED 312 and the BJT 306 both have a temperature coefficient of −2.7 mV/° C., the 1.0 Volt drop provides a voltage reference which is substantially stable with temperature.

The resistors 316, 318 form a voltage divider. The values for the resistors 316 and 318 are selected as 350 KOhm and 10 MOhm, respectively, to divide down the 1.0 Voltage drop to 35 mV at the node formed at the base of the second BJT 304. The 35 mV forms a voltage reference which appears across the sensing resistor 320. The second BJT 304 is configured as an emitter follower and reduces the impedance at the sensing resistor 320. The base voltage for the BJT 304 is 35 mV higher than the collector voltage for the BJT 304. Since the base voltage for the BJT 304 varies over temperature, the first BJT 302 is provided for compensation with the base connected to the collector of the BJT 304. If the first BJT 302 and the second BJT 304 are both the same device, e.g. 2N4401, the temperature variance will be approximately the same and as a result the voltage difference between the emitter of first BJT 302 and the emitter of the second BJT 304 will remain at 35 mV. The current flowing through the sensing resistor 320 is determined as I=35 mV/R9, where R9 is the resistance value of the resistor 320.

As shown in FIG. 4, the collector for the third BJT 306 is preferably left open. If the collector and the base of the BJT 306 are tied together, the voltage drop across the base-emitter may vary from 0.5V and different temperature coefficient may also result.

It will be appreciated that the emitter impedance $r_e$ for the first BJT 302 and the second BJT 304 need to be the same for the above calculations to hold. The emitter impedance $r_e$ is determined as $r_e$=25 mV/$I_c$, where $I_c$ is the collector current. The respective collector currents in the first BJT 302 and the second BJT 304 depend the voltage rail Vcc. Since both of the BJT's 302 and 304 are coupled to the voltage rail Vcc, any change in the voltage rail Vcc is experienced by both of the BJT's 302 and 304.

In operation the current source 22 functions as a short circuit for a current (e.g. inrush current) which is lower than the threshold current for the source 22. For a 20 mA loop powered application, it is desirable to maintain the voltage drop in the low millivolt range for a current less than 22 mA. Advantageously, the voltage reference is temperature compensated and remains relatively stable over a wide temperature range. In addition, the implementation for the current sources 22 as described above provide a quick response time to accommodate the voltage transients.

The current source circuits 100, 200, 300 described above with reference to FIGS. 2–4 exhibit a number of advantageous characteristics. First, the current source acts essentially as a short circuit for current below the threshold value, e.g. 22 mA for a 20 mA loop application. Secondly, the voltage drop of the current source circuit 100, 200, 300 is in the milli-volt range for a loop current of 22 mA. Thirdly, the response of the current source circuits 100, 200, 300 is fast to react to any voltage transients which may occur in the loop. Fourthly, the current source circuits 100, 200, 300 require a small bias or polarization current, typically, in the order of 5 uA.

It will be appreciated that the ability of the current source circuits 100, 200, 300 to maintain a precise current is less important than temperature stability, particularly, in level measurement applications where the temperature range may vary from −40° C. to +85° C.

Figure 5:
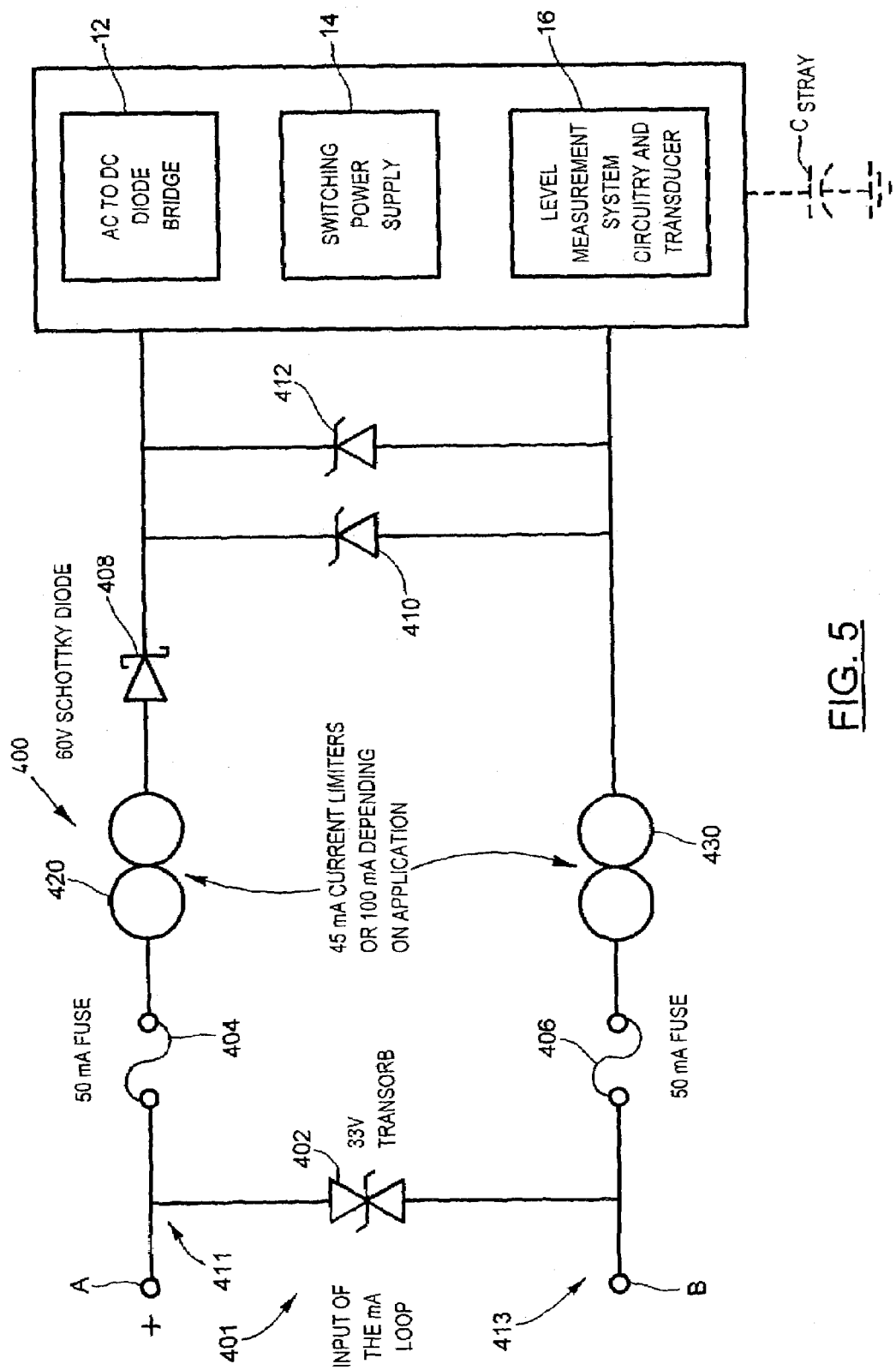
FIG. 5 is a schematic diagram of a current limiter circuit according to the present invention utilized as additional protection devices in a loop powered device.

Reference is next made to FIG. 5, which shows a current limiter circuit 400 augmenting the front-end interface for a 4-to-20 mA loop interface indicated by reference 410.

As shown in FIG. 5, the loop interface 410 comprises an input branch 411 with terminal A and a return branch 413 with terminal B. The loop interface 410 is coupled to the current loop coupled having a remote receiver (not shown) as described above with reference to FIG. 1. The level measurement system, i.e. the AC-to-DC diode bridge 12, the switching power supply 14, transducer circuitry 16, are represented by reference 401. The loop interface 410 includes a fuse 404 on the input branch 411 and another fuse 406 on the return branch 413. The input branch 411 also includes a Schottky diode 408. First 410 and second 412 Zener diodes are coupled across the input branch 411 and the return branch 413. The Zener diodes 410, 412 are preferably power rated.

According to this aspect, the current limiter circuit 400 comprises a first current source circuit 420 and a second current source circuit 430. The first current source circuit 420 is coupled between the fuse 404 and the Schottky diode 408 and serves to limit the current in the input branch. The second current source circuit is 430 is coupled to the second fuse 406 in the return branch 413. The second current source circuit 430 is provided to limit current in the return branch 413 arising from stray capacitance $C_{stray}$ in the circuitry 401. The current limiter circuit 400 also includes a varistor or transorb device 402 which is coupled across the terminals A and B as shown in FIG. 5.

The current source limiter circuits 420 and 430 serve to protect the fuses 404, 406 against high inrush current. The power Zener diodes 410, 412 provide surge protection against fast transitional impulses or transients that can damage these devices. As the voltage can rise to 60 Volts, for example, across the transorb device 402, the Zener diodes 410, 412 clamp the voltage at approximately 33 Volts and with the current limiters 420, 430, the fuses 404, 406 are protected. For intrinsically safe or for explosion proof applications, the circuitry is typically potted, for example, in epoxy. Therefore, if one or two of the fuses 404, 406 and/or one or both of the Zener diodes 410, 412 are blown, it is not possible to replace the damaged device without dismantling the epoxy encased circuitry. Accordingly, the current source limiter circuits 420, 430 can enhance the operating life of the loop interface 410.

The current source limiter circuits 420, 430 are implemented according to the embodiments described above with reference to FIG. 2, 3 or 4 above.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A protection device for process control-equipment operating on a current loop, said process control equipment having an interface for coupling to the current loop, said interface comprising an input branch and a return branch, said protection device comprising:
   a current source element, said current source element being coupled to the interface of the process control equipment, and said current source element including a current limiter circuit to limit the current flowing in the interface;
   a voltage reference circuit, said voltage reference circuit being coupled to said current source element, and providing a predetermined voltage reference during operation of said current source element.

2. The protection device as claimed in claim 1, wherein said voltage reference circuit includes a temperature compensation circuit, said temperature compensation circuit maintaining said predetermined voltage reference stable over a range of temperatures.

3. The protection device as claimed in claim 1, wherein said current source element comprises a field effect transistor device, said field effect transistor device being configured to provide a constant current output.

4. The protection device as claimed in claim 3, further including a power resistor, said power resistor being coupled across said current source element and providing protection for said current source element against a large magnitude current.

5. The protection device as claimed in claim 2, wherein said temperature compensation circuit includes a light emitting diode for generating a predetermined drop voltage and said drop voltage having a known temperature variance characteristic.

6. The protection device as claimed in claim 5, wherein said temperature compensation circuit comprises a first transistor having a base coupled to the anode of said LED and to a voltage supply rail through a first resistor, the cathode of said LED being coupled to the collector of a second transistor, the base of the second transistor being coupled to the emitter of said first transistor, and the base of second transistor also being coupled to the base of a third transistor, said third transistor having a collector coupled to the voltage supply rail, a sensing resistor and the emitter of said third transistor being coupled to a terminal of said sensing resistor, and the emitter of said second transistor being coupled to another terminal of said sensing resistor, and including a fourth transistor connected as a diode, said fourth transistor being coupled to the field effect transistor to provide a bias voltage for said fourth transistor.

7. The protection device as claimed in claim 2, wherein said voltage reference circuit includes a sensing resistor, said sensing resistor determining a current limit in conjunction with the voltage reference output of said voltage reference circuit.

8. The protection device as claimed in claim 7, wherein said temperature compensation circuit comprises a first transistor, said transistor having an emitter coupled to a voltage supply rail, and a base coupled to one terminal of said sensing resistor, and a collector coupled to the base of a second transistor, and the emitter of the second transistor being coupled to another terminal of said sensing resistor, and the collector of said second transistor being coupled to the voltage supply rail.

9. The protection device as claimed in claim 8, wherein said current source element comprises a field effect transistor device, and said first and second transistors comprise Bi-polar junction devices, and further including a third transistor connected as a diode to bias said field effect transistor device.

10. The protection device as claimed in claim 9, further including a power resistor, said power resistor being coupled across said field effect transistor device to provide protection against large current flow in the circuit.

11. The protection device as claimed in claim 2, wherein said current source element comprises a field effect transistor device, said field effect transistor device being configured to provide a constant current output.

* * * * *